United States Patent
Silverman et al.

(10) Patent No.: US 12,160,819 B2
(45) Date of Patent: *Dec. 3, 2024

(54) DYNAMIC FREQUENCY COORDINATION IN SHARED WIRELESS COMMUNICATION ENVIRONMENTS

(71) Applicant: Cisco Technology, Inc., San Jose, CA (US)

(72) Inventors: Matthew A. Silverman, Shaker Heights, OH (US); Mahesh Daisy, Folsom, CA (US); Jerome Henry, Pittsboro, NC (US); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,285

(22) Filed: Jun. 5, 2023

(65) Prior Publication Data
US 2023/0319703 A1    Oct. 5, 2023

Related U.S. Application Data

(63) Continuation of application No. 17/447,175, filed on Sep. 8, 2021, now Pat. No. 11,864,104.

(51) Int. Cl.
*H04W 48/20*    (2009.01)
*H04W 76/15*    (2018.01)
*H04W 84/12*    (2009.01)

(52) U.S. Cl.
CPC ........ *H04W 48/20* (2013.01); *H04W 76/15* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 10,659,971 B2 * | 5/2020 | Egner | H04W 16/18 |
| 2015/0327282 A1 * | 11/2015 | Werner | H04W 72/542 |
| | | | 455/450 |
| 2021/0211886 A1 * | 7/2021 | Damnjanovic | H04W 76/11 |
| 2022/0210823 A1 * | 6/2022 | Alfarhan | H04L 1/1887 |

* cited by examiner

*Primary Examiner* — Hong S Cho
(74) *Attorney, Agent, or Firm* — Patterson + Sheridan, LLP

(57) ABSTRACT

Various embodiments herein disclose coordinating frequencies for an access point (AP). A corresponding method comprises evaluating a performance profile for the AP, the performance profile comprising a first part related to a first network generated by a first radio of the AP and a second part related to a second network generated by a second radio of the AP. The method also comprises selecting first channels on which the AP generates the first network based on the performance profile and spectral regrowth profiles for transmission power levels of the first radio. The method additionally comprises selecting second channels on which the AP generates the second network based at least in part on the performance profile and the spectral regrowth profiles. Furthermore, the method comprises enabling communications between a first set of devices on the first channels and enabling communications between a second set of devices on the second channels.

20 Claims, 4 Drawing Sheets

DYNAMIC FREQUENCY COORDINATION IN SHARED WIRELESS COMMUNICATION ENVIRONMENTS

CROSS-REFERENCE TO RELATED APPLICATIONS

This application is a continuation of co-pending U.S. patent application Ser. No. 17/447,175 filed Sep. 8, 2021. The aforementioned related patent application is herein incorporated by reference in its entirety.

TECHNICAL FIELD

Embodiments presented in this disclosure generally relate to dynamically coordinating communication frequencies in shared wireless communication environments. More specifically, embodiments disclosed herein relate to performing resource management for different types of devices communicating in an environment.

BACKGROUND

As Internet-of-Things (IoT) devices that communicate in wireless personal area networks (WPANs) are deployed in different environments with increased numbers, contentions between such devices and existing devices that communicate in wireless local area networks (WLANs) also increase. These contentions impair performance of the IoT devices, because current contention logic does not protect IoT devices from contention caused by WLAN devices. For example, due to higher transmit power levels and spectral regrowth from transmissions in WLAN frequency channels, neighboring frequency channels to the WLAN frequency channels may face increased contention and, thus, reduced performance for IoT devices served by co-located access points (APs), such as APs that transmit to both the WLAN and WPAN devices.

Current contention reduction methods exclude specific frequency channels from WLAN devices to keep frequency channels available for the WPAN devices, in view of the spectral regrowth on the WLAN frequency channels. Alternatively, certain frequency channels can be excluded from use by WPAN networks. However, such methods can result in inefficient or wasted frequency channels that are excluded from WLAN and saved for WPAN devices for APs that serve primarily WLAN devices or vice versa.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
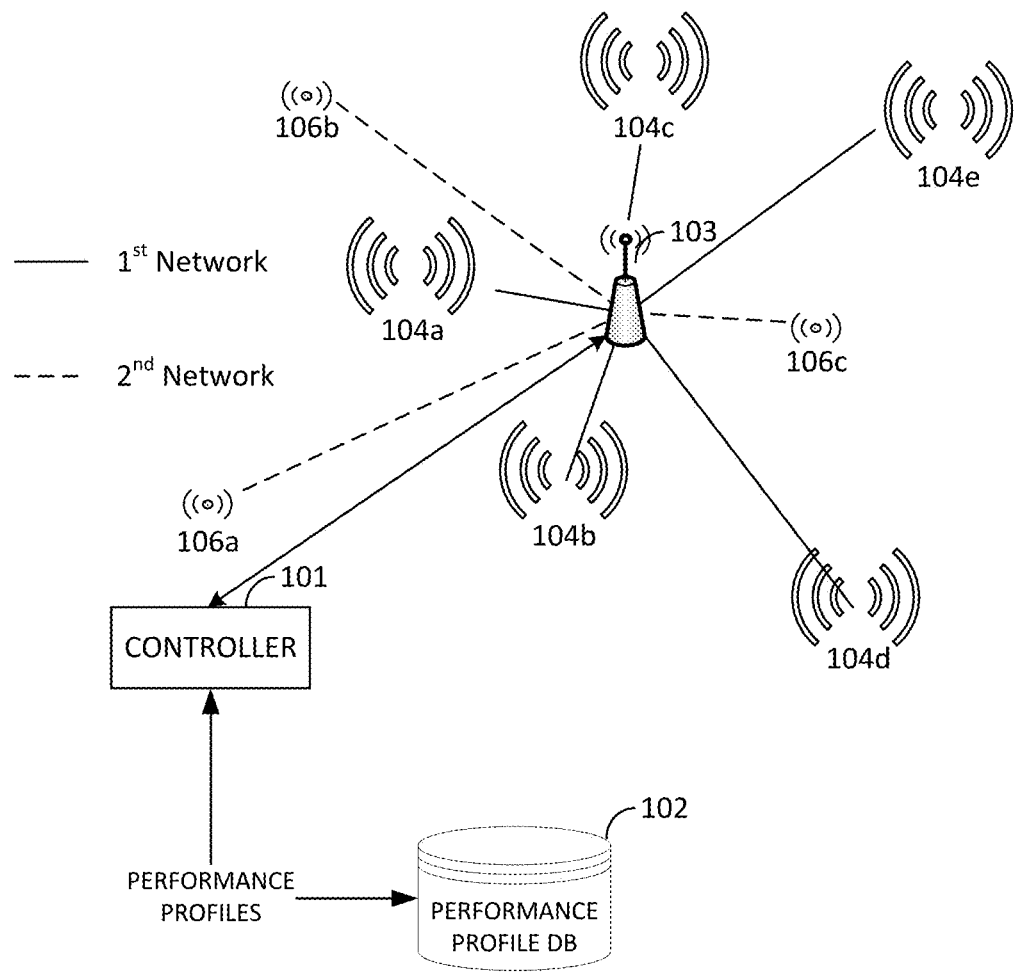
FIG. 1 depicts a system diagram for a wireless communication system that communicates over a first network and a second network, according to aspects described herein.

Various embodiments disclosed herein include apparatuses, systems, devices, and methods for coordinating frequencies for an access point (AP) serving multiple types of devices. A method comprises evaluating a performance profile for a network provided by the AP. The performance profile may comprise a first part or portion related to a first network and a second part related to a second network. The first and second networks may correspond to different protocols or communication network types. As an example, the first network corresponds to a wireless personal area network (WLAN) while the second network corresponds to a wireless local area network (WPAN). The method further comprises selecting first channels on which the access point generates the first network based on the performance profile and spectral regrowth profiles for transmission power levels of the first radio. The method also comprises selecting second channels on which the access point generates the second network based at least in part on the performance profile and the spectral regrowth profiles. The method additionally comprises enabling communications between the first set of devices on the first channels and enabling communications between the second set of devices on the second channels.

In accordance with some embodiments, a wireless controller comprises one or more processors and a memory storing instructions that, when executed by the one or more processors, cause the wireless controller to perform a method evaluating a performance profile for a network provided by the AP. In accordance with some embodiments, a non-transitory computer readable storage medium has stored therein instructions, which, when executed by one or more processors of a wireless controller, cause the wireless controller to perform or cause performance of any of the methods described herein. In accordance with some embodiments, a wireless controller includes: a communication interface, one or more processors, and a non-transitory memory for performing or causing performance of any of the methods described herein.

Example Embodiments

In many communication systems, a single AP with multiple radios communicating using different protocols or co-located APs using the different protocols may communicate with different types of devices or different networks of devices. For example, an AP may include a first radio providing a first network (for example, a WLAN-type radio providing a WLAN network) and a second radio providing a second network (for example, a WPAN-type radio providing a WPAN network) to communicate with respective devices. In some embodiments, communications with the first radio and on the first network occur at higher transmit power levels when communicating with Wi-Fi devices on the WLAN network than communications with the second radio on the second network, creating interference and other issues for Internet-of-Things (IoT) devices communicating on the WPAN network. For example, if the second radio tries to receive data while the first radio is transmitting data, this transmission by the first radio may create interference for the reception by the second radio due to the high first radio transmit power levels. To avoid contention between the first and second networks and corresponding devices, the AP may cleanlist specific frequency channels (e.g., indicate that listed channels are available for use) or blocklist specific frequency channels (e.g., indicate that listed channels are excluded or blocked from use) for the second radio dependent upon frequency channels on which the first radio broadcasts, or vice versa. Additionally, radio channel impairments may impact channels being served by the AP, which may further limit available channels for communications on the first or second network with, for example, corresponding devices.

The frequency channels used by the first and second radios and corresponding devices are often closely spaced. WLAN frequency channels are often larger (for example, each covering 20 megahertz (MHz) of the frequency spectrum) than WPAN frequency channels (for example, frequency hopping across a 2.4 gigahertz (GHz) frequency band covering approximately 2 MHz of the spectrum for a given transmission). In some instances, the WLAN frequency channels may overlap with the WPAN frequency channels (for example, in the 2.4 gigahertz (GHz) frequency range, be established between WLAN frequency channels, or otherwise be in close proximity to WLAN frequency channels. This proximity or overlap may result in the WLAN communications, disrupting the WPAN communications by causing interference, and so forth.

Furthermore, WLAN transmissions by the AP can create spectral regrowth due to nonlinear effects of power amplifiers in a transmission path of the AP. As power levels increase, the spectral regrowth may grow to exceed the frequency channels in which the WLAN-type radio broadcasts frequency channel and be sidebands of each of the WLAN frequency channels due to, for example, 3rd order distortion products. For example, for the WLAN frequency channel having a width of 20 MHz, the spectral regrowth at sufficiently high transmission power levels may have a width of 25 MHz or more (and may be centered around the WLAN frequency channel), such that the spectral regrowth overlaps with neighboring WPAN frequency channels. As APs transmit with WLAN devices at higher or highest transmit power levels, the spectral regrowth increases and can impact communications on adjacent channels to the WLAN frequency channel, even inhibiting or impairing such communications on the adjacent channels, such as WPAN communications on the WPAN network. Where an amount of spectral regrowth is high or large, the spectral regrowth may have a greater impact on more neighboring frequencies or channels than smaller amounts of spectral regrowth.

Thus, due to the close spacing of the WPAN and WLAN frequency channels, the spectral regrowth from transmissions on the WLAN frequency channels can degrade communications on the WPAN frequency channels. Accordingly, selection of channels for WPAN communications should account for the spectral regrowth generated by neighboring WLAN channels and power levels of transmissions on those WLAN channels.

As more APs start to include radios for both WLAN and WPAN communications, efficiently identifying which channels are available for the different communications types and making as many channels available for the communication types is critical to avoid creating contention and interference between the communication types. Certain methods of avoiding contention and interference may blocklist specific channels or enforce spectral masks for one or more of the communication types to enable communications on certain other neighboring channels. However, blocklisting one or more channels may be overly conservative and prevent use of channels that would be otherwise usable in view of any potential interference considerations. Additionally, blocklisting channels may be relatively static and may be established when the APs configure the respective radios for the communication types. However, as conditions may change during operation and as devices move about, the static establishment may not always be up-to-date and become overly conservative.

Embodiments herein dynamically and precisely identify and allocate channels to co-located radios of an AP without blocklisting or cleanlisting channels for either of the radios. The co-located radios communicate with different devices on different channels. For example, a first set of radios may communicate with one or more Wi-Fi devices in a WLAN-type network while a second set of radios may communicate with one or more IoT devices in a WPAN-type network. The WLAN network may communicate with protocols including the IEEE 802.11 family of protocols and corresponding frequencies, while the WPAN network communicates using protocols including the IEEE 802.15.4 family of protocols and corresponding frequencies. Additional considerations when identifying and allocating channels to the first radio and the second radio may include one or more of uplink received signal strength indicators (RSSIs) for communications received by a Wi-Fi or an IoT device, a spectral regrowth profile for transmissions by the first radio at different transmission power levels and the corresponding impact on transmissions by the second radio, and uplink/downlink traffic statistics for the communications with the first radio. For example, if a majority of the traffic statistics indicate transmissions by the AP on the first radio occur at a high transmit power levels that create spectral regrowth which flows into channels neighboring the WLAN channels, then a controller may avoid allocating channels that are impacted by the spectral regrowth to the second radio. On the other hand, if a majority of the traffic statistics indicate transmissions by the AP on the first radio occur at low enough transmit power levels that minimal spectral regrowth flows into the neighboring channels, then the controller may more liberally allocate channels to the second radio because spectral regrowth impacts are less of a concern than at the higher transmission powers. In such cases, the second radio may be allocated more channels than at higher transmission power levels by the first radio. By monitoring these statistics, the power levels, and the spectral regrowth relatively live or in relative real-time, the controller may dynamically allocate or recalibrate channels between the first and second radios to reduce interference and contention while maintaining respective communications threshold for the radios.

In some embodiments, the controller uses a monitor or scanning radio or receives reports of statistics, etc., received by different devices receiving communications from one or both of the first radio and second radio of the AP. In some embodiments, changes in temperature, quantities of devices, the environment, and so forth, can impact the spectral regrowth and other factors that create interference between the radios and frequency channels. The recalibration features of the controller may reduce interference in view of such changes.

While the example embodiments described herein relate to APs, similar methodologies can be applied to other wireless communication devices having different capabilities and configurations. In some embodiments, the APs and the controller described herein comprise a processor and memory and the like.

FIG. 1 depicts a system diagram for a wireless communication system 100 that communicates over a first network and a second network generated by an AP 103 having co-located radios, according to an exemplary embodiment. The system 100 includes first devices 104a-104e that communicate over the first network and second devices 106a-106c that communicate over the second network. A first radio of the AP 103 creates the first network, which may comprise a WLAN or similar network, to enable the communications between the first devices 104a-104e, which may comprise Wi-Fi devices, using protocols including the IEEE 802.11 family of protocols and corresponding frequencies. A second radio of the AP 103 creates the second network, which may comprise a WPAN or similar network, to enable the communications between the second devices 106a-106c, which may comprise IoT devices, using protocols including the IEEE 802.15.4 family of protocols and corresponding frequencies. In some embodiments, the first devices 104 and the first radio of the AP 103 transmit on the first network at higher transmission power levels than the second devices 106 and the second radio of the AP 103. In some embodiments, the second network at least partially overlaps the first network (for example, in a 2.4 GHz spectrum) such that transmissions on the first network can interfere with or contend with transmissions on the second network.

The system 100 further includes a controller 101 that performs one or more methods or processes described herein to manage and coordinate frequency allocations for the radios of the AP 103. Such allocations may be made based on various data, including a density of the first network and the second network as provided by the AP 103 radios, available transmission power levels for the first radio and the second radio in the overlapping portion(s) of the 2.4 GHz spectrum and corresponding spectral regrowth profiles, network performance profiles (which may include aspects or details of service level agreements (SLAs) that establish service that will be provided), and the like. The densities of the first and second networks may correspond to amounts of transmissions on each network or numbers of devices on each network.

The available transmission power levels may include power levels for the channels on which each of the first radio and the second radio will generate the first network and the second network, respectively. The power levels information may include details regarding how different transmission power levels and corresponding power spectrums for the different channels can impact neighboring channels. Furthermore, the corresponding spectral regrowth profiles indicate how spectral regrowth at higher transmission power levels can further impact the neighboring channels. In some embodiments, controller 101 can determine, based on the power levels information and the corresponding spectral regrowth profiles, which channels are available for communications on the second network based on the transmission power levels of the first devices 104 on the first network.

In some embodiments, the first radio and the second radio of the AP 103 are Complementary Metal Oxide Semiconductor (CMOS) based and calibrated at manufacturing to tune first radio characteristics, such that spectral regrowth profiles can be identified. In some embodiments, when first radios are calibrated and tuned, if a third order Orthogonal Frequency Division Multiplexing (OFDM) distortion characteristics may be estimated such that the spectral regrowth profiles can be utilized during configuration time of the second radio. The third order distortion products may vary for different devices depending on one or more of: Radio PA linearity, OFDM peak to average ratio that may depend on current operating rates and modes (such as IIg rates of 6, 9, 12, 18, 24, 36, 48, 54 Mbps as well as MCS0-9), other device design aspects such as front end module (FEM) such as baluns, couplers, and filters in a radio chain may also impact distortion effects.

Another way to estimate spectral regrowth profiles comprises using a scanning device to estimate the third order OFDM characteristics while a transmission having a high peak to average ratio is transmitted on a transmit channel with the first radio. For example, the controller 101 sequentially estimates spectral regrowth profiles for a channel based on transmitting the transmission on different transmit channels (and/or at different rates and transmit power levels). At the same time, the scanning device measures spectral regrowth on channels adjacent to the transmit channel (for example, one or more on each side), where distortion effects are expected. Thus, the controller 101 can identify the channels where interference exists relative to the transmit channel and mark such channels in a table, or similar data store, according to the transmit channel. In some embodiments, one or more algorithms may estimate the spectral regrowth for first devices and for a channels list for the first devices. An example algorithm for a Wi-Fi network may comprise setting up a main Wi-Fi channel, transmitting OFDM (or MCS0-9) signals for a duration T on the main Wi-Fi channel, and using a scanning Wi-Fi device to estimate spectral regrowth for neighboring Wi-Fi channels. The use of the scanning Wi-Fi device comprising setting up the scanning Wi-Fi device to scan adjacent upper sideband (T/2)/estimate regrowth on the upper channel relative to the main Wi-Fi channel and setup the scanning Wi-Fi device to scan adjacent lower sideband (T/2)/estimate regrowth on the lower channel relative to the main Wi-Fi channel. Based on the scans, the algorithm may further create a map or list of the main Wi-Fi channel and second device channel lists include what channels are allowed (e.g., on a cleanlist) or disallowed (e.g., on a blocklist) for the second device at a given first channel power level, and so forth for each Wi-Fi main channel where there are spectral interferers.

In some embodiments, spectral regrowth profiles can be mapped to transmission events with an intermittent (for example, once per hour, etc.) calibration, where the first radio goes through a known sequence of transmissions at different transmission power levels and the scanning radio gets fast Fourier transfer (FFT) captures. The spectral regrowth profile may appear in the FFT captures and can be mapped back with the order of the known sequence as well as the RSSI.

Network performance profiles may identify, for an AP 103 that includes the first radio and the second radio (i.e., that supports communications for devices on different networks), whether the first radio or the second radio is prioritized or biased over the other. The controller 101 may access the network performance profiles from a performance profile database 102 or similar data store.

Figure 2:
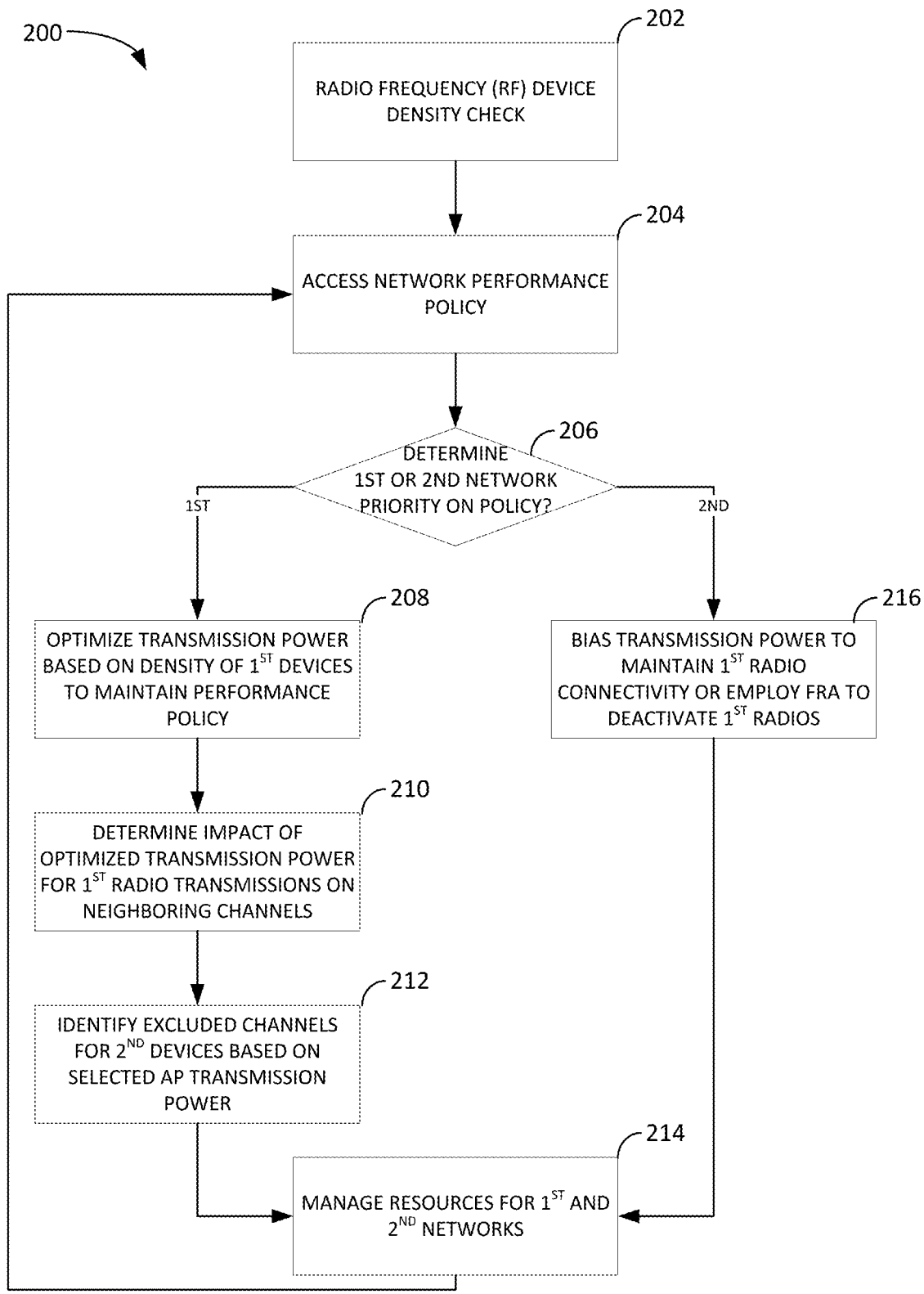
FIG. 2 depicts a flowchart for a process of coordinating communication frequencies for an access point (AP) serving multiple types of devices, according to aspects described herein.

FIG. 2 depicts a flowchart for operations 200 for coordinating communication frequencies for an AP, such as the AP 103 of FIG. 1, serving multiple types of devices, such as first devices 104 and second devices 106, according to aspects described herein. The operations 200 can be performed by a controller, such as the controller 101 of FIG. 1, the AP, a device communicating on a network generated by the AP (such as one of devices 104 or 106), or another device not shown.

At step 202, the AP checks device densities on networks generated by the AP. For example, when the AP generates a first network and a second network, the AP may check device densities on each network. Thus, the AP may identify a number of devices communicating on each of the first network and the second network.

The AP may check the densities by monitoring communications on each network or communicating with each device on the corresponding networks. Specifically, to identify the density of the first network, the controller may instruct the first radio of the AP to monitor transmissions on the first network and/or communicate with the first devices. Similarly, the controller may instruct the second radio of the AP to monitor communications on the second network and/or communicate with the second devices to identify the density of the second network. In some embodiments, the AP checks device densities in response to a request from the controller. Accordingly, the AP and/or the controller can evaluates densities of the first network and the second network in an area served.

At step 204, the controller accesses a network performance profile for the AP from, for example, a data store (for example, the performance profile database 102 of FIG. 1). In some embodiments, the network performance profile applies for just the AP or for a number of APs providing coverage in the area. The network performance profiles may identify whether the first radio or the second radio is prioritized or biased over the other. For example, the performance profile for the AP can indicate that the AP is to prioritize or optimize communications with the first devices over the second devices. In some embodiments, the network performance profiles can be manually generated by, for example, an end user or automatically detected by one of the AP or the controller.

In some embodiments, the network performance profile can be obtained based on a user configuration and/or measured based on scanning devices on the first and second networks. In some embodiments, more than one network performance profile exists for the AP or for the area served by the AP, such that different sections of the area can have different network performance profiles. For example, a single site could have localized network performance profiles for auditoriums, classrooms, general spaces, breakrooms, and so forth.

At step 206, the controller determines whether the accessed network performance profile prioritizes or biases the first network or the second network. When the network performance profile prioritizes the first network, the operations 200 progress to step 208. When the network performance profile prioritizes the second network, the operations 200 progress to step 216. In some embodiments, the controller determines the priority based on corresponding performance policies and SLAs.

The controller may leverage priority or bias information from the network performance profiles to dynamically allocate frequency channels to the first radio and network and to the second radio and network. Specifically, if the network performance profile for the AP indicates that communications on the first network are to be optimized over those on the second network, the controller, which performs radio resource management (RRM), may optimize effective isotropic radiated power (EIRPs) or transmit power output (TPO) levels for the first radio.

At step 208, the controller or the AP optimizes a transmission power for a first radio of the AP generating the first network. The controller may optimize the EIRPs and be biased to ensure that the first radio provides proper coverage and the transmit power control (TPC) assigned to or for the first radio to meet any SLA of the network performance profile for the AP. By optimizing the EIRPs based on the network performance profile prioritizing the first radio, the controller 101 can satisfy higher SLAs for the corresponding first devices by providing higher modulation coding schemes (MCSs) using higher power downlinks. In some embodiments, the transmission power of the first radio is optimized based on the network performance profile accessed at step 204 and the density of first devices communicating on the first radio. For example, the controller 101 assigns frequencies and performs power control optimizations to maximize performance for the first devices and to meet SLAs and performance demands for the first devices in the area served by the first radio of the AP. Furthermore, the controller may determine the optimal EIRP based on at least in part on the density of the first devices on the first network, which may enable the controller to maintain roaming considerations. In some embodiments, optimizing the transmission power maintains one or more performance parameters of one or more of the first devices and/or one or more roaming considerations for the first set of devices.

At step 210, the controller identifies a frequency distribution for the first network, a maximum power, and a maximum power range to determine excluded frequency channels for the second network. For example, the controller may use a TPO range for the first network to determine a set of excluded channels for the second network. In some embodiments, the RSSI of one or more of the devices 106a-106c is known at the second radio and can be shared to the controller for decisions about excluded channels.

Once the controller optimizes the transmission power levels for the first radio as described above, the controller may determine an impact of the optimized first radio transmission power levels on neighboring frequencies. The controller thereby can effectively utilize the impact of the optimized first radio transmission power levels on the neighboring channels when selecting and allocating channels to the second radio and corresponding second devices, thereby integrating actual allocations of channels. This enables the controller to integrate actual usage for the first radio and first network into account when allocating the channels to the second radio and second network. In some embodiments, the controller limits allowed frequencies for the first radio based on determining the optimizations for the first radio, described above, and the impact of those optimizations on available frequencies for the second radio.

In some embodiments, the controller creates and/or updates a blocklist of excluded channels such that each second device is provided with an indication of which channels are not available for use and a signal-to-noise ratio (SINR) margin. For example, the controller may update the blocklist to provide each second device with the SINR margin relative to the available channels based on worst case conditions (for example, the largest expected spectral regrowth) that may impact the available channels. In some embodiments, the first devices and/or the second devices may perform measurements of spectral regrowth and/or RSSI for one or more of the first devices or the second devices. Based on such measurements, the controller can provide updates to the blocklist, etc., as appropriate.

At step 212, the controller identifies excluded channels from a blocklist for the second network based on the TPO and corresponding statistics for the first network and the first radio. For example, where the first radio generates the first network with a high TPO, a power profile and corresponding spectral regrowth profile for the first radio may indicate that multiple neighboring frequency channels experience interference because of the high TPO and the corresponding spectral regrowth. Thus, the controller may limit or exclude a larger number of neighboring frequency channels when the first radio TPO is high and there is additional spectral regrowth as compared to when the first radio TPO is lower with less spectral regrowth.

At step 214, the controller manages the resources for the first and second networks in response to the optimized TPO for the first network and first radio and the excluded frequency channels for the second network from the blocklist. Such managing of the resources may comprise the AP enabling communications on the first network and the second network according to the selected channels.

At step 216, when the network performance profile is slated for the second network, the controller may prioritize the second network and reduce priority for the first network to maximize available channels for the second network. Prioritizing the second network may comprise maximizing and selecting available channels for the second radio. Further, the controller may reduce priority on the first network by biasing a transmit power selection of the first network such that network connectivity for the first devices is merely maintained without gaps in coverage, thereby minimizing disruption to the first devices without necessarily focusing on maintaining particular downlink powers, and the like.

For example, the controller may negatively bias the first radio of the AP to reduce potential channel overlap between the first network created by the first radio and the second network created by the second radio. When negatively biased, the first radio my transmit at lower transmission power levels (as compared to when unbiased) that maintains communications for the first devices roaming about an area of coverage without necessarily optimizing or enabling high powered transmissions for the first devices. Such negative biasing, which reduces the first radio transmission power levels, may reduce spectral regrowth and, thus, increase the available channels for the second devices. Alternatively, the controller may employ flexible radio assignment (FRA) or similar techniques to selectively deactivate first radios for one or more APs and enable those APs to maximize communications with corresponding second radios for second devices on the second network. For example, using FRA (or similar) techniques, the controller identifies and isolates those APs in an area that can have their first radios deactivated without greatly impacting the area in which the first devices are able to communicate. By deactivating the first radios for the identified APs, the second radios for those APs can broadcast on corresponding frequency channels with reduced concern of interference from the co-located first radios, thereby effectively enabling allocation of a larger number of frequency channels to the second radios than if the first radios were participating in the first network. For example, the first radio may be restricted or disabled from transmitting on a 2.4 GHz frequency spectrum and instead serve a 5 GHz frequency spectrum, leaving the second devices to transmit in the 2.4 GHz frequency spectrum. In some embodiments, FRA may be used in scenarios of high-density of corresponding devices to easily or more efficiently disable the 2.4 GHz radio on one or more AP, while biasing may be used in lower density scenarios.

Alternatively, as introduced above, if the network performance profile is focused on the second devices communicating on the second network, a distribution of the second devices relative to localized sectors in the area influences channel needs at the AP or at a set of APs. As such, the controller may optimize the second network frequency channels for deployments of different types of second device distributions. Furthermore, the controller may employ a flexible radio resource optimization method, such as FRA, to reduce frequency channels used by the first radio and the first network, for example, by disabling the first radio of one or more APs in the sectors having higher demand for frequency channels on the second network. As introduced above, disabling the first radios at APs having co-located second radios reduces first network communications and makes those channels that would otherwise be used by the first network available to the second network. Furthermore, this allows the controller to utilize the first network as a packet transmission arbiter (PTA), which may cause the first network to relinquish a channel to the second network if and/or as needed. In some embodiments, if optimal channels for the second network can be identified and employed, then PTA schemes can be avoided. Based on prioritizing the second network and negatively biasing or employing flexible radio resource optimization methods to allocate frequencies between the first and second networks, the controller manages the resources for the first and second networks at step 214.

In some embodiments, the operations 200 may repeat steps 204-216 as appropriate based on changes in the first and second network densities, changes in network performance profiles, and the like.

In some embodiments, the controller and/or the AP identifies statistics, such as uplink/downlink traffic statistics, and the like, from the first radio and the second radio and corresponding first devices and second devices, as monitored by one of the first devices and second devices or a scanning radio. Based on such statistics, the controller and/or the AP may calculate a breakdown of a percentage of transmit powers used over a period, the period defined or corresponding to how frequently the operations 200 are repeated and how frequently excluded channels are identified and excluded. The period may depend on a variance of the breakdown of the percentage of the transmit powers sent and whether or not that variance results in a material difference in the spectral regrowth profiles resulting from the transmit power of the first radio.

Figure 3:
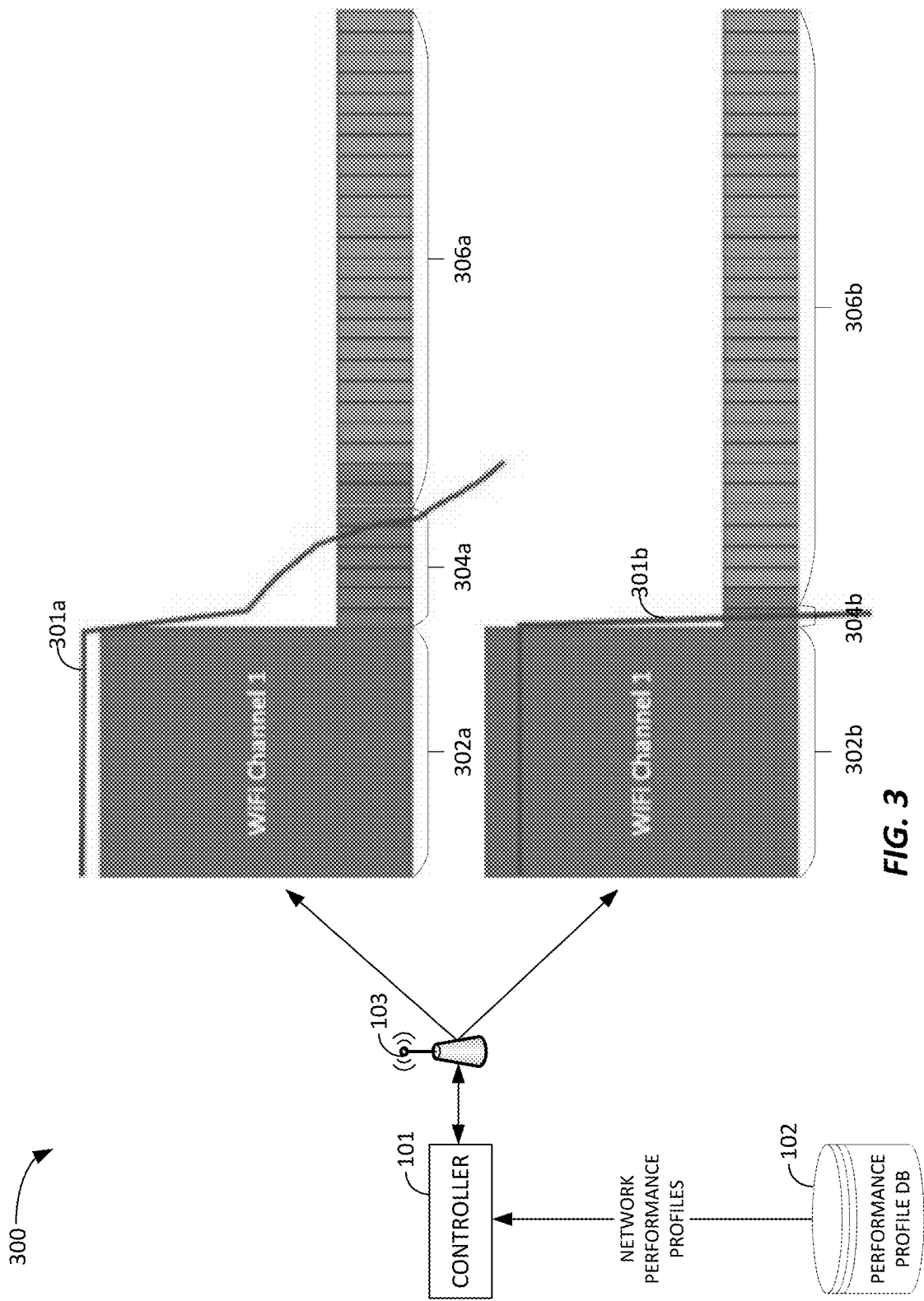
FIG. 3 depicts an AP of the system of FIG. 1 selecting between two transmission power profiles for communicating with the multiple types of devices, according to aspects described herein.

FIG. 3 depicts an AP 103 of the system, such as the system 100 of FIG. 1, that selects between two transmission power profiles for communicating with multiple types of devices, according to aspects described herein. The controller 101 may cause the AP 103 to prioritize communications based on a network performance profile that prioritizes the first network. Accordingly, the AP 103 may use a first radio to generate a first network with a power signal 301a having a power level as shown at channel 302a and having a frequency range as shown. When the first radio is transmitting with the power signal 301a, the transmitted power level may result in spectral regrowth profile that covers channel 304a (for example, corresponding to six individual channels or frequencies). The controller 101 may restrict usage of the channels 304a by a second network to avoid the power levels and the spectral regrowth of the power signal 301a from interfering with communications on the second network. Instead, the controller 101 may allocate the channels 306a to the second network, such that the channels 306a for the second network are less impacted by communications on the first network.

Alternatively, the controller 101 may cause the AP 103 to prioritize communications on the second network generated by a second radio of the AP 103 based on a network performance profile that prioritizes the second network. Accordingly, the first radio of the AP 103 may generate the first network using the power signal 301b (for example, having a lower transmit power level than the power signal 301a). When the first radio is transmitting with the power signal 301b, the transmitted power level may result in spectral regrowth profile that covers channels 304b (for example, corresponding to two individual channels or frequencies). The controller 101 may restrict usage of the channels 304b by the second channel to avoid the power levels and the spectral regrowth of the power signal 301b from interfering with communications on the second channel. The controller 101 may allocate the channels 306b to the second network, which, because of the lower transmit power level for the signal 301b, includes more channels than channels 306a.

Figure 4:
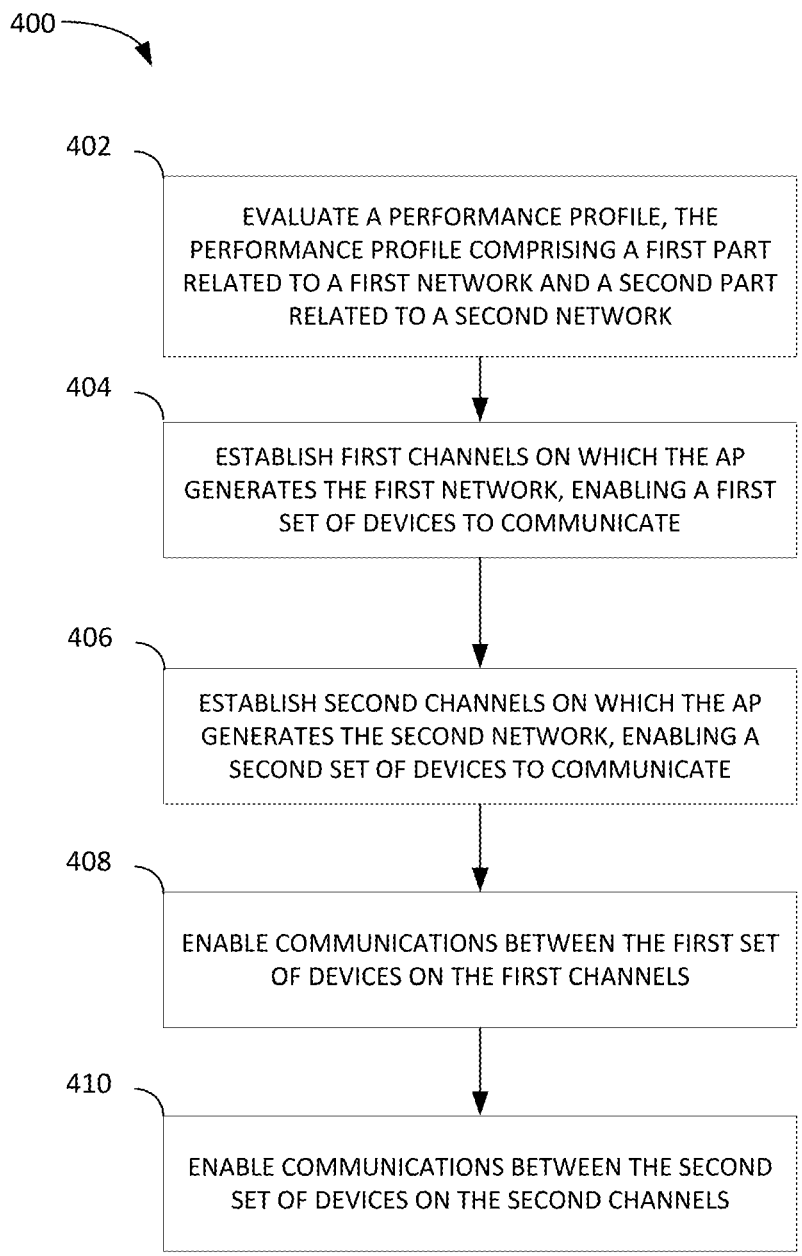
FIG. 4 is a flowchart of a method of coordinating frequencies for an AP serving multiple types of devices, according to aspects described herein.

FIG. 4 is a flowchart of a method 400 of coordinating frequencies for an AP serving multiple types of devices, according to aspects described herein. As discussed herein, the AP may serve the multiple types of devices according to a network performance profile that dictates whether to prioritize or bias a first network or a second network. The flow chart of the method 400 may be performed by one of the components of the system 100 of FIG. 1, such as the controller 101 or the AP 103. While the description below includes reference to components of the system 100 of FIG. 1, the blocks of the method 400 are not limited to those example embodiments and may apply to various other combinations of components. Furthermore, the method 400 is not required to perform each of or only the shown blocks and is not limited to performing the indicated blocks in any particular order.

At block 402, the controller evaluates a performance profile for the AP, the performance profile comprising a first part related to a first network generated by a first radio of the AP and a second part related to a second network generated by a second radio of the AP, as discussed above with respect to steps 202-206 of FIG. 2. In some embodiments, the AP may evaluate the performance profile obtained from the controller or a data store, such as the performance profile database 102.

At block 404, the controller or the AP selects first channels on which the AP generates the first network, enabling a first set of devices to communicate, based on the performance profile and spectral regrowth profiles for transmission power levels of the first radio. The first channels may be determined based on the performance profile identifying the first network as being prioritized. The selection of the first channels may correspond to steps 208 and 210 of FIG. 2 and the corresponding discussion.

At block 406, the controller or the AP selects second channels on which the AP generates the second network, enabling a second set of devices to communicate, based at least in part on the performance profile and the spectral regrowth profiles. The second channels may be selected based on the remaining channels that are not restricted following the selection of the first channels. The selection of the first channels may correspond to step 216 of FIG. 2 and the corresponding discussion.

At block 408, the AP enables communications between the first set of devices on the first channels with the first type of communications. The enabling of communications on the first channels may correspond to step 214 of FIG. 2 and the corresponding discussion.

At block 410, the AP enables communications between the second set of devices on the second channels with the second type of communications. The enabling of communications on the second channels may correspond to step 214 of FIG. 2 and the corresponding discussion.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A non-transitory, computer-readable medium comprising instructions that, when executed by a processor, cause the processor to perform a method of coordinating frequencies for an access point (AP), the method comprising:
    selecting first channels on which the AP generates a first network based on a performance profile for the AP and spectral regrowth profiles for transmission power levels of a first radio;
    selecting second channels on which the AP generates a second network based at least in part on the performance profile and the spectral regrowth profiles; and
    enabling device communications on the first channels and the second channels.

2. The non-transitory, computer-readable medium of claim 1, wherein the first network comprises a wireless local area network (WLAN) type and wherein a first set of devices on the first channels comprises devices that communicate according to communications compatible with an IEEE 802.11 standard.

3. The non-transitory, computer-readable medium of claim 1, wherein the second network comprises a wireless personal area network (WPAN) type and wherein a second set of devices on the second channels comprises devices that communicate according to communications compatible with an IEEE 802.15.4 standard.

4. The non-transitory, computer-readable medium of claim 1, wherein the performance profile is configured by an end user or automatically detected.

5. The non-transitory, computer-readable medium of claim 1, wherein the method further comprises identifying the spectral regrowth profiles for the first channels.

6. The non-transitory, computer-readable medium of claim 1, wherein the AP provides network coverage in an area and wherein the performance profile applies to a portion of the area.

7. A wireless controller comprising one or more processors and a memory storing instructions that, when executed by the one or more processors, cause the wireless controller to perform an operation, the operation comprising:
    identifying a density of a first set of devices that communicate on a first network and a density of a second set of devices that communicate on a second network;
    upon determining that access priority is given to the first network, optimizing a transmission power of a first radio of an access point (AP) communicating with the first set of devices based on a density of the first set of devices; and
    upon determining that access priority is given to the second network, optimizing a transmission power of a second radio of the access point to prioritize available communication channels for the second set of devices.

8. The wireless controller of claim 7, wherein the first network comprises a wireless local area network (WLAN) type and wherein the first set of devices comprises devices that communicate according to communications compatible with an IEEE 802.11 standard.

9. The wireless controller of claim 7, wherein the second network comprises a wireless personal area network (WPAN) type and wherein the second set of devices comprises devices that communicate according to communications compatible with an IEEE 802.15.4 standard.

10. The wireless controller of claim 7, wherein the operation further comprises:
    determining, based on a network performance profile, whether access priority is given to the first network or the second network, wherein the network performance profile is configured by an end user or automatically detected.

11. The wireless controller of claim 10, wherein the AP provides network coverage in an area and wherein the network performance profile identifies whether access priority is given to the first network or the second network within a portion of the area and wherein a second network performance profile identifies whether access priority is given to the first network or the second network within a second portion of the area.

12. The wireless controller of claim 7, wherein the operation further comprises identifying one or more spectral regrowth profiles for the first network.

13. The wireless controller of claim 7, wherein upon determining that access priority is given to the second network, employing a flexible radio assignment to selectively deactivate the first radio and maximize channels for the second radio.

14. The wireless controller of claim 7, wherein upon determining that access priority is given to the second network, negatively biasing the first network to maintain coverage for the first set of devices without optimizing communications for the first set of devices.

15. A wireless controller, comprising one or more processors and a memory storing instructions that, when executed by the one or more processors, cause the wireless controller to perform an operation, the operation comprising:
 selecting first channels on which an access point (AP) generates a first network based on a performance profile for the AP and spectral regrowth profiles for transmission power levels of a first radio;
 selecting second channels on which the AP generates a second network based at least in part on the performance profile and the spectral regrowth profiles; and
 enabling device communications on the first channels and the second channels.

16. The wireless controller of claim 15, wherein the first network comprises a wireless local area network (WLAN) type and wherein a first set of devices on the first channels comprises devices that communicate according to communications compatible with an IEEE 802.11 standard.

17. The wireless controller of claim 15, wherein the second network comprises a wireless personal area network (WPAN) type and wherein a second set of devices on the second channels comprises devices that communicate according to communications compatible with an IEEE 802.15.4 standard.

18. The wireless controller of claim 15, wherein the performance profile is configured by an end user or automatically detected.

19. The wireless controller of claim 15, wherein the operation further comprises identifying the spectral regrowth profiles for the first channels.

20. The wireless controller of claim 15, wherein the AP provides network coverage in an area and wherein the performance profile applies to a portion of the area.

* * * * *

UNITED STATES PATENT AND TRADEMARK OFFICE
CERTIFICATE OF CORRECTION

PATENT NO. : 12,160,819 B2
APPLICATION NO. : 18/329285
DATED : December 3, 2024
INVENTOR(S) : Matthew A. Silverman et al.

It is certified that error appears in the above-identified patent and that said Letters Patent is hereby corrected as shown below:

In the Specification

In Column 6, Line 12, delete "MCSO-9)," and insert -- MCS0-9), --.

In Column 6, Line 35, delete "MCSO-9)" and insert -- MCS0-9) --.

Signed and Sealed this
Twenty-ninth Day of April, 2025

Coke Morgan Stewart
*Acting Director of the United States Patent and Trademark Office*